(12) United States Patent
Bulot et al.

(10) Patent No.: US 10,392,121 B2
(45) Date of Patent: Aug. 27, 2019

(54) AIR SUPPLY PLENUM

(71) Applicant: Safran Helicopter Engines, Bordes (FR)

(72) Inventors: Nicolas Bulot, Narcastet (FR); Fabrice Marchand, Lasseube (FR)

(73) Assignee: Safran Helicopter Engines, Bordes (FR)

( * ) Notice: Subject to any disclaimer, the term of this patent is extended or adjusted under 35 U.S.C. 154(b) by 170 days.

(21) Appl. No.: 15/532,822

(22) PCT Filed: Dec. 2, 2015

(86) PCT No.: PCT/FR2015/053291
§ 371 (c)(1),
(2) Date: Jun. 2, 2017

(87) PCT Pub. No.: WO2016/087776
PCT Pub. Date: Jun. 9, 2016

(65) Prior Publication Data
US 2017/0361943 A1    Dec. 21, 2017

(30) Foreign Application Priority Data

Dec. 5, 2014 (FR) ..................... 14 61997

(51) Int. Cl.
*F02M 35/10* (2006.01)
*B64D 33/02* (2006.01)
(Continued)

(52) U.S. Cl.
CPC .............. *B64D 33/02* (2013.01); *F02C 7/055* (2013.01); *F02M 35/10* (2013.01); *F15D 1/02* (2013.01);
(Continued)

(58) Field of Classification Search
CPC ............ F02M 35/10; B64D 33/02; F15D 1/02
(Continued)

(56) References Cited

U.S. PATENT DOCUMENTS

| 3,513,641 A | 5/1970 | Hopper et al. |
| 3,952,972 A | 4/1976 | Tedstone et al. |

(Continued)

FOREIGN PATENT DOCUMENTS

FR    2914016 A1    9/2008

OTHER PUBLICATIONS

French Preliminary Search Report dated Aug. 11, 2015 in Patent Application No. 1461997 (with English language translation of categories of cited documents).
(Continued)

*Primary Examiner* — Robert A Hopkins
(74) *Attorney, Agent, or Firm* — Oblon, McClelland, Maier & Neustadt, L.L.P.

(57) ABSTRACT

An air supply plenum for an engine, the plenum being disposed upstream of an air intake of the engine, the air intake being provided in a casing of the engine. The air supply plenum includes a first lateral wall and a second lateral wall which together form a conduit in which an air flow flows as the engine functions. Each lateral wall includes a step which forms a transverse recess relative to the direction of the air flow in the air supply plenum, such that an aerodynamic separation occurs in the step when the engine is operating.

11 Claims, 3 Drawing Sheets

(51) Int. Cl.
*F02C 7/055* (2006.01)
*F15D 1/02* (2006.01)

(52) U.S. Cl.
CPC .................. *B64D 2033/022* (2013.01); *B64D 2033/0226* (2013.01); *B64D 2033/0246* (2013.01); *F05D 2220/329* (2013.01); *F05D 2250/511* (2013.01)

(58) Field of Classification Search
USPC ........................................ 123/184.21, 184.34
See application file for complete search history.

(56) References Cited

U.S. PATENT DOCUMENTS

| | | | |
|---|---|---|---|
| 6,990,941 B1 * | 1/2006 | Bender | F02M 35/10032 123/184.21 |
| 2008/0041328 A1 * | 2/2008 | Granatelli | F02M 35/021 123/184.21 |
| 2010/0101206 A1 | 4/2010 | Haehner et al. | |

OTHER PUBLICATIONS

International Search Report dated Mar. 3, 2016 in PCT/FR2015/053291 (with English translation of categories of cited documents).
International Search Report dated Mar. 3, 2016, in PCT/FR2015/053291, filed Dec. 2, 2015.

* cited by examiner

AIR SUPPLY PLENUM

The present invention relates to the air supply plenum of an engine.

More precisely, it relates to a particular form of the air supply plenum of a helicopter engine.

GENERAL TECHNICAL FIELD AND PRIOR ART

Current engines, and more particularly helicopter engines, encounter a problem with creating aerodynamic separation at the air supply plenum of the engine, upstream of the air intake of the engine.

An air supply plenum according to the prior art, which is positioned at an air intake 2 of the engine, is shown in FIG. 1 and FIG. 2. The air intake 2 of the engine is provided in a casing 3 of the engine. A grid 4 is positioned at the air intake 2 of said engine. In order to maintain this grid 4 in position at the air intake of the engine, the air intake 2 comprises lips 5 directed toward the outside of the engine, and on which the grid is positioned. Due in particular to the presence of these lips 5, aerodynamic separation 6 occur which reduce the width of the air flow 7 in the plenum 11 and create inhomogeneity in the air flow 7, thus causing an aerodynamic loss phenomenon. This aerodynamic loss at the air intake 2 of the engine brings about an overall loss of performance in the engine.

In order to find a solution for this problem of loss of engine performance, it is known to use a more powerful engine so as to compensate this performance loss. Such a solution leads to excess fuel consumption and to a surcharge for the helicopter, this increasing the hourly cost for use of the helicopter.

GENERAL PRESENTATION OF THE INVENTION

A general aim of the invention is to propose an air supply plenum which makes it possible to increase performance of the engine by reducing the impact of the phenomenon of the formation of aerodynamic separation.

More particularly, according to one aspect, the invention consists of an air supply plenum for an engine disposed upstream of an air intake of said engine provided in a casing of said engine, said air supply plenum comprising a first lateral wall and a second lateral wall which together form a conduit in which an air flow flows as said engine functions, characterized in that each lateral wall comprises a notch which forms a transverse recess relative to the direction of the air flow in the air supply plenum, such that an aerodynamic separation occurs in said notch when said engine is operating.

According to an additional feature, the air intake of the engine comprises lips which comprise a leading edge and which project outside the conduit formed by said air supply plenum, the air intake of the engine also comprising a protective grid positioned on the lips, said lips being suited for holding the protective grid in position.

According to a particular feature, the notches are formed by a sudden change in curvature of the lateral walls, the first lateral wall and the second lateral wall thus each comprising a sharp ridge, and said lateral walls each having two half-tangents at said ridges.

According to another additional feature, the ratio between, on the one hand, the radial spacing between the ridge of the first lateral wall and the protective grid, and on the other hand the radial spacing between the leading edge of the lips and the protective grid perpendicular to the first lateral wall is comprised between 0.1 and 10; and the ratio between, on the one hand, the radial spacing between the ridge of the second lateral wall and the protective grid, and on the other hand the radial spacing between the leading edge of the lips and the protective grid perpendicular to the second lateral wall is comprised between 0.1 and 10.

According to another additional characteristic, the area ratio between, on the one hand, an annular surface delimited by the notches and on the other hand an annular surface delimited by the leading edge of the lips is comprised between 0.1 and 10 times the area ratio between, on the on hand, the annular surface delimited by the leading edge of the lips and on the other hand an annular surface delimited by the air intake of the engine.

According to another feature, the notch in each of the lateral walls forms a notch angle comprised between 30 degrees and 180 degrees.

According to another feature, the recess formed by each of the notches comprises a recess bottom angle equal to 90 degrees.

According to a particular feature, each of the lateral walls comprises only a single notch.

According to another aspect, the invention consists of an engine comprising an air supply plenum according to any one of the preceding features.

According to an additional aspect, the invention consists of a helicopter containing such an engine.

DESCRIPTION OF THE FIGURES

Other features, aims and advantages of the present invention will appear upon reading the detailed description that follows, and with reference to the appended drawings, given as non-limiting examples and wherein.

DESCRIPTION OF ONE OR MORE EMBODIMENTS

Figure 1:
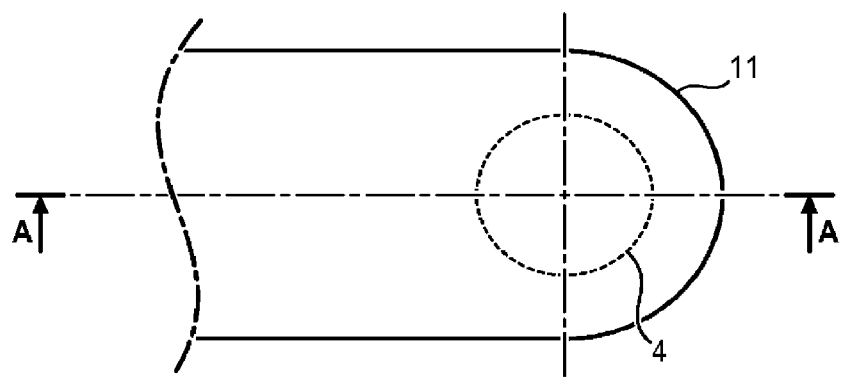
FIG. 1 shows a top view of an air supply plenum according to the prior art.
Figure 2:
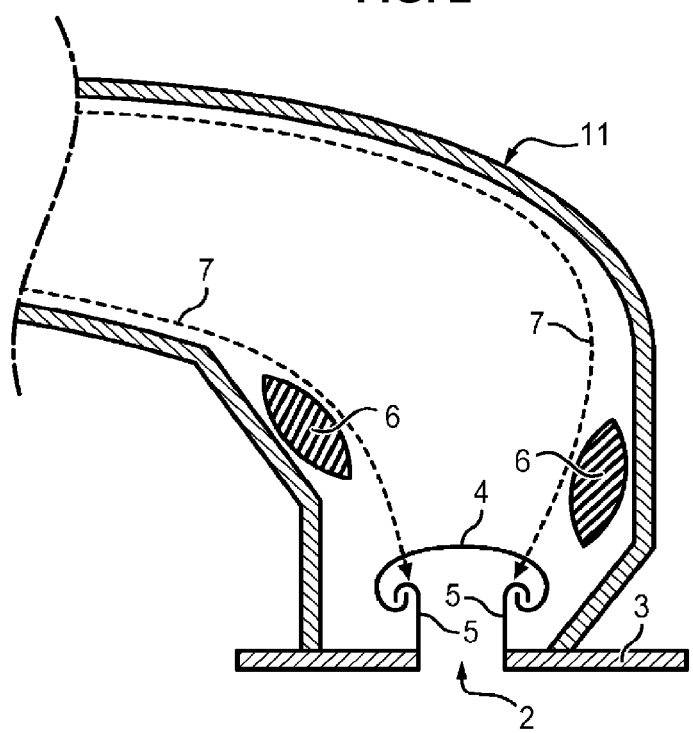
FIG. 2 shows a section view along axis AA of the air supply plenum according to the prior art.
Figure 3:
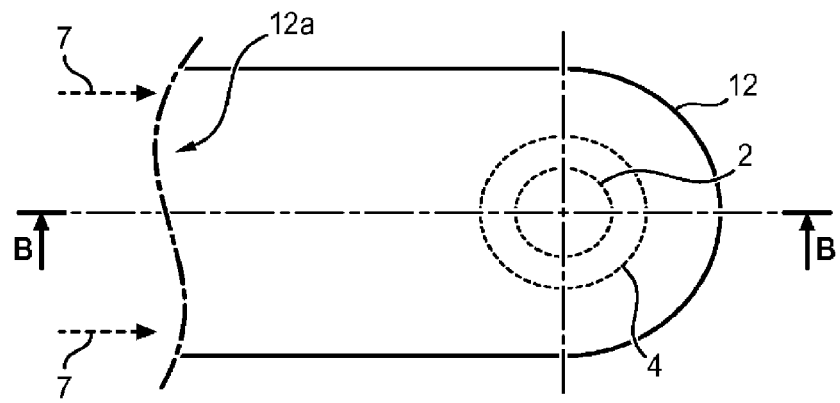
FIG. 3 shows a top view of an air supply plenum according to the invention.

Shown in FIG. 3, is an air supply plenum 12 of a helicopter engine which is positioned at an air intake 2 of said helicopter engine.

Figure 4:
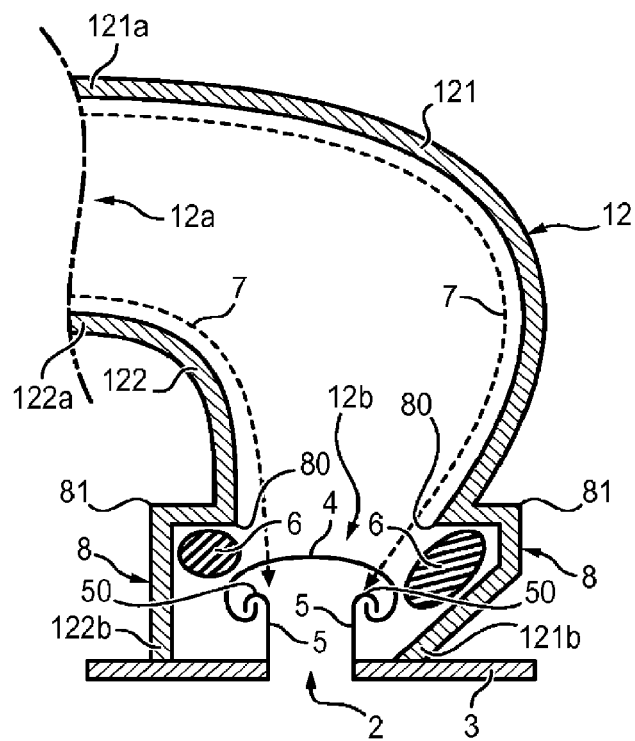
FIG. 4 shows a section view along axis BB of an air supply plenum according to a first embodiment.

As shown in FIG. 4, the plenum 12 comprises a first lateral wall 121 and a second lateral wall 122 which form together a conduit guiding an air flow 7 coming from the outside toward the air intake 2 of the engine.

The two lateral walls 121 and 122 each comprise two ends 121*a*, 121*b* and 122*a*, 122*b*. The first ends 121*a*, 122*a* of the two lateral walls 121 and 122 form a first end 12*a* of the air supply plenum 12 through which the air flow 7 penetrates into said air supply plenum 12. The second ends 121*b* and 122*b* of the two lateral walls 121 and 122 form a second end 12*b* of the plenum 12 through which the air flow 7 penetrates into the air intake 2 of the engine.

The engine comprises a casing 3 wherein the air intake 2 of the engine is provided. The casing 3 comprises lips 5 which project inside the conduit formed by the air supply plenum 12. The lips 5 comprise a leading edge 50 which forms an end that projects into the conduit formed by the air supply plenum 12. It is by the leading edge 50 of the lips 5 that the air flow 7 penetrated into the air intake 2.

The lips 5 of the casing 3 make it possible to hold in position a protective grid 4 which is positioned upstream of the air intake 2 of the engine relative to the direction of the air flow 7. The grid 4 makes it possible to protect the engine against the ingestion of objects and the formation of ice. According to one possible embodiment, the air intake 2 may not be protected by the grid 4.

In order for the grid 4 to optimally accomplish its protective function, a minimum spacing is necessary between the grid 4 and the walls 121 and 122 of the air supply plenum 12. In fact, for example during creation of a layer of ice on the grid 4, so as not to perturb the air flow 7, it is necessary that the ice layer not come into contact with the walls 121 and 122 of the air supply plenum 12.

In order for a minimum space to be created between the grid 4 and the walls 121 and 122, the lips 5 must also be separated from the lateral walls 121 and 122. This spacing between the lips 5 and the lateral walls 121 and 122 necessarily causes the formation of aerodynamic separation 6 between the two ends 12a and 12b of the air supply plenum 12.

So as to reduce the degradation of the performance of the engine caused by the creation of aerodynamic separation 6, the lateral walls 121 and 122 each comprise a notch 8 comprised between their two ends 121a, 121b and 122a, 122b. Each of the notches 8 forms a recess toward the exterior of the air supply plenum 12, said recess being transverse relative to the direction of flow of the air flow 7 in the air supply plenum 12. Equivalently, it is possible to define the notches 8 as being localized increases in the diameter of the air supply plenum 12.

The notches 8 make it possible to control the formation of aerodynamic separation 6, so that the aerodynamic separation 6 is formed inside the notches 8. In one embodiment, the notches 8 are formed by a sudden change of curvature of the lateral walls 121 and 122, so that the lateral walls 121 and 122 each form a sharp ridge 80 and that the walls 121 and 122 thus comprise two half-tangents at said sharp ridges 80.

Figure 5:
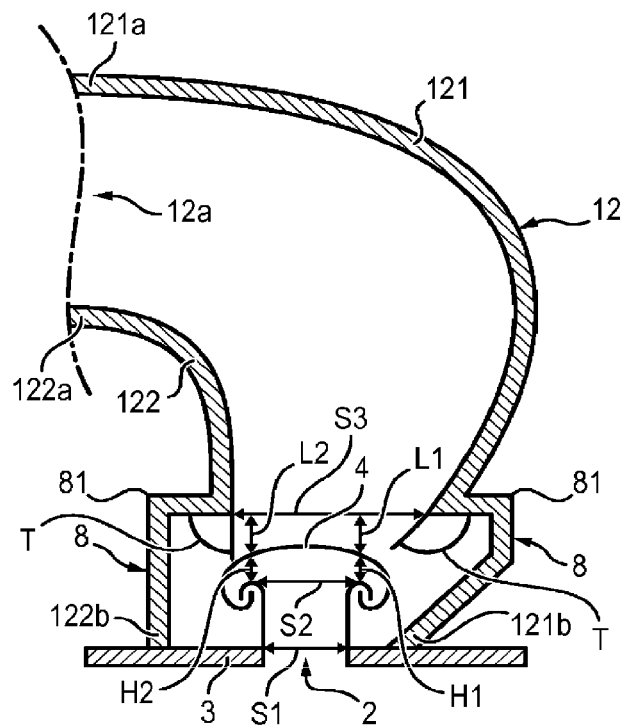
FIG. 5 shows the same view as FIG. 4 whereon the proportions of the plenum are highlighted.

Preferably, as shown in FIG. 5, the notches 8 of each of the lateral walls 121 and 122 form a notch angle T which is comprised between 30 degrees and 180 degrees. More precisely, the notch angle T is the angle formed by the curvature change of the lateral walls 121 and 122. For example, in the case where the notches 8 are formed by a sudden change in the curvature of the lateral walls 121 and 122, the angle T is the angle between these two half-tangents at the sharp ridges 80. Expressed differently, the notch angle T is the angle formed by the lateral walls 121 and 122 at the beginning of the recess formed by the notch 8, hence at the end of the recess formed by the notch 8 closest to the air intake 2 (the end located farthest inward in the conduit formed by the plenum 12).

According to an advantageous aspect, the notches 8 are formed by a sudden change in curvature of the walls 121 and 122 so that the recess formed by the notches 8 comprises a recess bottom angle 81 equal to 90 degrees. More precisely, the recess bottom angle 81 is the angle formed by the lateral walls 121 and 122 at the end of the recess formed by the notch 8, and therefore at the end of the recess formed by the notch 8 farthest from the air intake 2 (the end located farthest inside the conduit formed by the plenum 12).

Preferably, the lateral walls 121 and 122 have a curvature such that no other aerodynamic separation forms elsewhere than in the notches 8. More precisely, the lateral walls 121 and 122 comprise only a single notch 8.

Thus, by confining the separation 6 in the notches 8, the phenomenon of reduction of the width of the air flow 7 is prevented, thus allowing an increase in the overall performance of the engine.

As shown in FIG. 5, the air intake 2 of the engine delimits an annular surface S1, which corresponds to the surface of the opening made in the casing 3 of said engine, or π times the diameter squared of the air intake 2. The leading edge 50 of the lips 5 delimits an annular surface S2, which corresponds to π times the diameter squared of the circle formed by the leading edge 50 of the lips 5. The notches 8 delimit an annular surface S3, which corresponds to 7 times the diameter squared of the plenum 12 just before the increase of said plenum 12 diameter by the notches 8. Advantageously, the area ratio between the annular surface S3 and the annular surface S2 is comprised between 0.1 and 10 times the area ratio between the annular surface S2 and the annular surface S1. Thus S3/S2 is comprised between 0.1 times and 10 times the area ratio S2/S1.

As also shown in FIG. 5, the ridge 80 of the first lateral wall 121 is separated from the protective grid 4 by a radial spacing L1. The ridge 80 of the second lateral wall 122 is separated from the protective grid 4 by a radial spacing L2. The leading edge 50 of the lips 5 is on the one hand separated from the protective grid 4 by a radial spacing H1 perpendicular to the first lateral wall 121; and on the other hand separated from the protective grid 4 by a radial spacing H2 perpendicular to the second lateral wall 122.

Preferentially, the ratio of radial spacing between the radial spacing L1 and the radial spacing H1 is comprised between 0.1 and 10, and the ratio of radial spacing between the radial spacing L2 and the radial spacing H2. Thus, the ratios between the radial spacings L1/H1 and L2/H2 are comprised between 0.1 and 10.

The provision of the notches 8 brings about an increase in the bulk of the air supply plenum 12, and hence of the mass of said air supply plenum 12. However, the performance gains of the engine with such an air supply plenum 12 largely compensate for the losses due to the mass increase. Thus, such a solution makes it possible to have the optimal compromise between mass increase of the air supply plenum 12 and the increase in the width and the homogeneity of the air flow 7.

Figure 6:
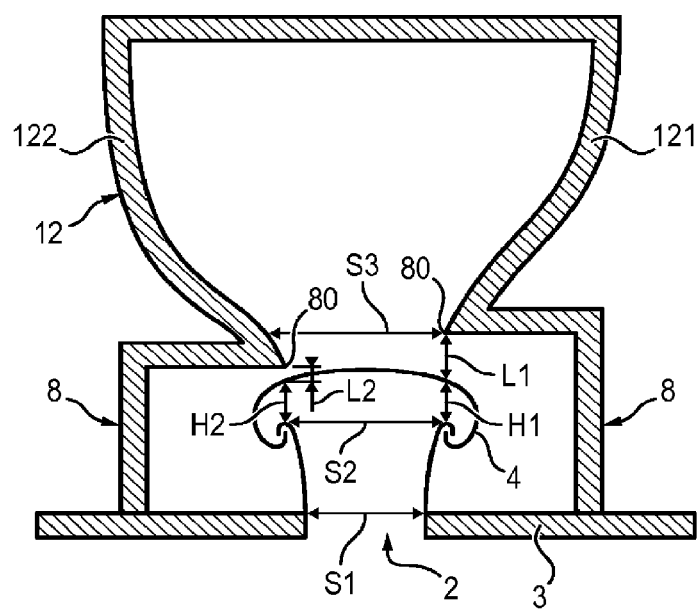
FIG. 6 shows a section view of an air supply plenum according to a second embodiment.

The second embodiment which is shown in FIG. 6 is an air intake plenum 12 which is shown in a section view along a section axis which is perpendicular to the axis of the section BB of the preceding FIGS. 4 and 5.

As shown in FIG. 6, in this second embodiment, the notch 8 in the first lateral wall 121 is made further upstream than the notch 8 in the second lateral wall 122 with respect to the air intake 2, unlike the first embodiment wherein the notches 8 are located at the same height. Thus, the radial spacing L1 between the ridge 80 of the first lateral wall 121 and the protective grid 4 is greater than the radial spacing L2 between the ridge 80 of the second lateral wall 122 and the protective grid 4.

Other embodiments are also possible. For example, the notches 8 may not be formed by a sudden change in curvature of the walls 121 and 122. The notches 8 can in effect be formed by bending the lateral walls 121 and 122 in such a manner that the lateral walls 121 and 122 each comprise a rounded notch bend and thus the lateral walls 121 and 122 each comprise a single tangent at the notch bend. In this variant, the notch angle T is formed by the angle formed by bending the lateral walls 121 and 122.

The invention claimed is:

1. An air supply plenum for an engine disposed upstream of an air intake of said engine provided in a casing of said engine, said air supply plenum comprising a first lateral wall and a second lateral wall which together form a conduit in which an air flow flows as said engine functions, wherein each lateral wall comprises a notch which forms a transverse recess relative to a direction of the air flow in the air supply plenum, such that an aerodynamic separation occurs in said notch when said engine is operating, wherein the air intake of the engine comprises lips which comprise a leading edge and which project inside the conduit formed by said air supply plenum, the air intake of the engine also comprising a protective grid positioned on the lips, said lips being suited for holding the protective grid in position.

2. The air supply plenum according to claim 1, wherein the notches are formed by a change in curvature of the lateral walls, so that the first lateral wall and the second lateral wall each comprise a sharp ridge, and said lateral walls each comprise two half-tangents at said ridges.

3. The air supply plenum according to claim 2, wherein:
a ratio between a radial spacing between the ridge of the first lateral wall and the protective grid and a radial spacing between the leading edge of the lips and the protective grid perpendicular to the first lateral wall is between 0.1 and 10; and
a ratio between a radial spacing between the ridge of the second lateral wall and the protective grid and a radial spacing between the leading edge of the lips and the protective grid perpendicular to the second lateral wall is between 0.1 and 10.

4. The air supply plenum according to claim 2, wherein an area ratio between an annular surface delimited by the notches and an annular surface delimited by the leading edge of the lips is between 0.1 and 10 times an area ratio between the annular surface delimited by the leading edge of the lips and an annular surface delimited by the air intake of the engine.

5. The air supply plenum according to claim 1, wherein the notch of each of the lateral walls forms a notch angle between 30 degrees and 180 degrees, the notch angle being formed by an end of the recess formed by the notch closest to the air intake.

6. The air supply plenum according to claim 1, wherein the recess formed by each of the notches comprises a recess bottom angle equal to 90 degrees, the bottom angle being formed by the end of the recess farthest from the air intake.

7. The air supply plenum according to claim 1, wherein each of the lateral walls has only a single notch.

8. An engine comprising the air supply plenum according to claim 1.

9. A helicopter comprising the engine according to claim 8.

10. The air supply plenum according to claim 2, wherein the notches are formed by a change in direction of each lateral wall with respect to a horizontal.

11. The air supply plenum according to claim 10, wherein the change in direction is at 90 degrees with respect to the horizontal.

* * * * *